US012617962B2

(12) United States Patent
Kuriki et al.

(10) Patent No.: US 12,617,962 B2
(45) Date of Patent: \*May 5, 2026

(54) AQUEOUS INK, INK EJECTION DEVICE, IMAGE RECORDING DEVICE, AND PRINTING METHOD

(71) Applicant: BROTHER KOGYO KABUSHIKI KAISHA, Nagoya (JP)

(72) Inventors: Hirofumi Kuriki, Nagoya (JP); Taro Nagano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 131 days.

This patent is subject to a terminal disclaimer.

(21) Appl. No.: 18/592,608

(22) Filed: Mar. 1, 2024

(65) Prior Publication Data

US 2024/0294789 A1 Sep. 5, 2024

(30) Foreign Application Priority Data

Mar. 2, 2023 (JP) ................................. 2023-031593
Oct. 31, 2023 (JP) ................................. 2023-186300

(51) Int. Cl.
*C09D 11/324* (2014.01)
*B41J 2/01* (2006.01)
(Continued)

(52) U.S. Cl.
CPC .............. *C09D 11/324* (2013.01); *B41J 2/01* (2013.01); *B41J 2/16505* (2013.01); (Continued)

(58) Field of Classification Search
CPC ... B41J 2/01; B41J 2/211; B41J 2/1433; B41J 2/17; B41J 2/17593; B41J 2/2107; (Continued)

(56) References Cited

U.S. PATENT DOCUMENTS

| | | | |
|---|---|---|---|
| 2004/0016367 A1* | 1/2004 | Koike | .................. C09D 11/322 106/31.77 |
| 2013/0300799 A1* | 11/2013 | Mizutani | .............. C09D 11/322 347/29 |

(Continued)

FOREIGN PATENT DOCUMENTS

| | | |
|---|---|---|
| EP | 3653678 A1 | 5/2020 |
| EP | 4253068 A2 | 10/2023 |

(Continued)

OTHER PUBLICATIONS

Extended European Search Report issued Nov. 28, 2024, in corresponding European Patent Application No. 24160546.8, 10 pages.
(Continued)

*Primary Examiner* — Manish S Shah
(74) *Attorney, Agent, or Firm* — Element IP, PLC

(57) ABSTRACT

An aqueous ink includes water, a solvent group A having a vapor pressure of 0.07 Pa or more at 25° C., a thickener, and a binder polymer. The solvent group A is present in the aqueous ink in a weight percent of 31.0 wt % to 55.0 wt % with respect to a total amount of the aqueous ink. The thickener is present in the aqueous ink in a weight percent of 13.0 wt % or less with respect to the total amount of the aqueous ink. The aqueous ink has a viscosity of 10 mPa·s to 14 mPa·s at 25° C.

14 Claims, 4 Drawing Sheets

(51) Int. Cl.

| | |
|---|---|
| *B41J 2/165* | (2006.01) |
| *B41J 2/21* | (2006.01) |
| *B41J 11/00* | (2006.01) |
| *B41J 13/08* | (2006.01) |
| *C09D 11/033* | (2014.01) |
| *C09D 11/037* | (2014.01) |
| *C09D 11/106* | (2014.01) |
| *C09D 11/107* | (2014.01) |
| *C09D 11/322* | (2014.01) |
| *C09D 11/38* | (2014.01) |

(52) U.S. Cl.
CPC ....... *B41J 2/16508* (2013.01); *B41J 2/16523* (2013.01); *B41J 2/2107* (2013.01); *B41J 11/00244* (2021.01); *B41J 13/08* (2013.01); *C09D 11/033* (2013.01); *C09D 11/037* (2013.01); *C09D 11/106* (2013.01); *C09D 11/107* (2013.01); *C09D 11/322* (2013.01); *C09D 11/38* (2013.01); *B41J 2002/16594* (2013.01); *B41P 2235/27* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/16538; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2016/0046816 | A1* | 2/2016 | Takahashi | C09D 11/326 |
| | | | | 524/506 |
| 2016/0115329 | A1 | 4/2016 | Ohmoto | |
| 2019/0185691 | A1* | 6/2019 | Takeshita | B41J 2/2107 |
| 2020/0332137 | A1* | 10/2020 | Kawata | B41J 2/2107 |
| 2022/0112389 | A1 | 4/2022 | Kuriki et al. | |
| 2023/0058241 | A1 | 2/2023 | Asakawa | |

FOREIGN PATENT DOCUMENTS

| | | |
|---|---|---|
| JP | 2008074887 A | 4/2008 |
| JP | 2020196779 A | 12/2020 |
| WO | WO-2015005394 A1 | 1/2015 |

OTHER PUBLICATIONS

Partial European Search Report issued Jul. 10, 2024 in corresponding European Patent Application No. 24160546.8, 10 pages.

* cited by examiner

AQUEOUS INK, INK EJECTION DEVICE, IMAGE RECORDING DEVICE, AND PRINTING METHOD

REFERENCE TO RELATED APPLICATIONS

This application claims priority from Japanese Patent Application No. 2023-031593 filed on Mar. 2, 2023 and Japanese Patent Application No. 2023-186300 filed on Oct. 31, 2023. The entire contents of these priority applications are incorporated herein by reference.

BACKGROUND ART

As an aqueous ink used in an ink jet recording device, an aqueous ink for ink jet recording of a related art is known. The aqueous ink for ink jet recording of the related art contains water, a water-soluble organic solvent, a pH adjusting agent, a viscosity adjusting agent, a surface tension adjusting agent, an antifungal agent, and the like. In the related art, a viscosity of the ink is adjusted to be low so that the ink is easily ejected from a nozzle of an ink jet head.

The above aqueous ink for ink jet recording has an excellent ink ejection property, but it is difficult to obtain a sharp image quality because the viscosity of the ink is low. This can lead to ragged edges. Therefore, in order to improve sharpness, it is conceivable to increase the viscosity beyond that of the above aqueous ink. However, this adjustment might deteriorate the ink ejection property, consume a large amount of solvent, and thus deteriorate a drying property of the ink depending on a type of the solvent and a solvent ratio. Moreover, a higher viscosity could cause the ink attached to the nozzle to dry quickly, increasing the likelihood of clogging, thus deteriorating a so-called decapping property.

SUMMARY

An object of the present disclosure is to provide an aqueous ink, an ink ejection device, an image recording device, and a printing method that an ink ejection property and image sharpness and also ensure a drying property and a decapping property.

An aqueous ink according to one aspect of the present disclosure includes water, a solvent group A having a vapor pressure of 0.07 Pa or more at 25° C., a thickener, and a binder polymer. The solvent group A is present in the aqueous ink in a weight percent of 31.0 wt % to 55.0 wt % with respect to a total amount of the aqueous ink. The thickener is present in the aqueous ink in a weight percent of 13.0 wt % or less with respect to the total amount of the aqueous ink. The aqueous ink has a viscosity of 10 mPa·s to 14 mPa·s at 25° C.

According to the present disclosure, the ink ejection property and the image sharpness are ensured, and the drying property and the decapping property are ensured.

DESCRIPTION

Figure 1:
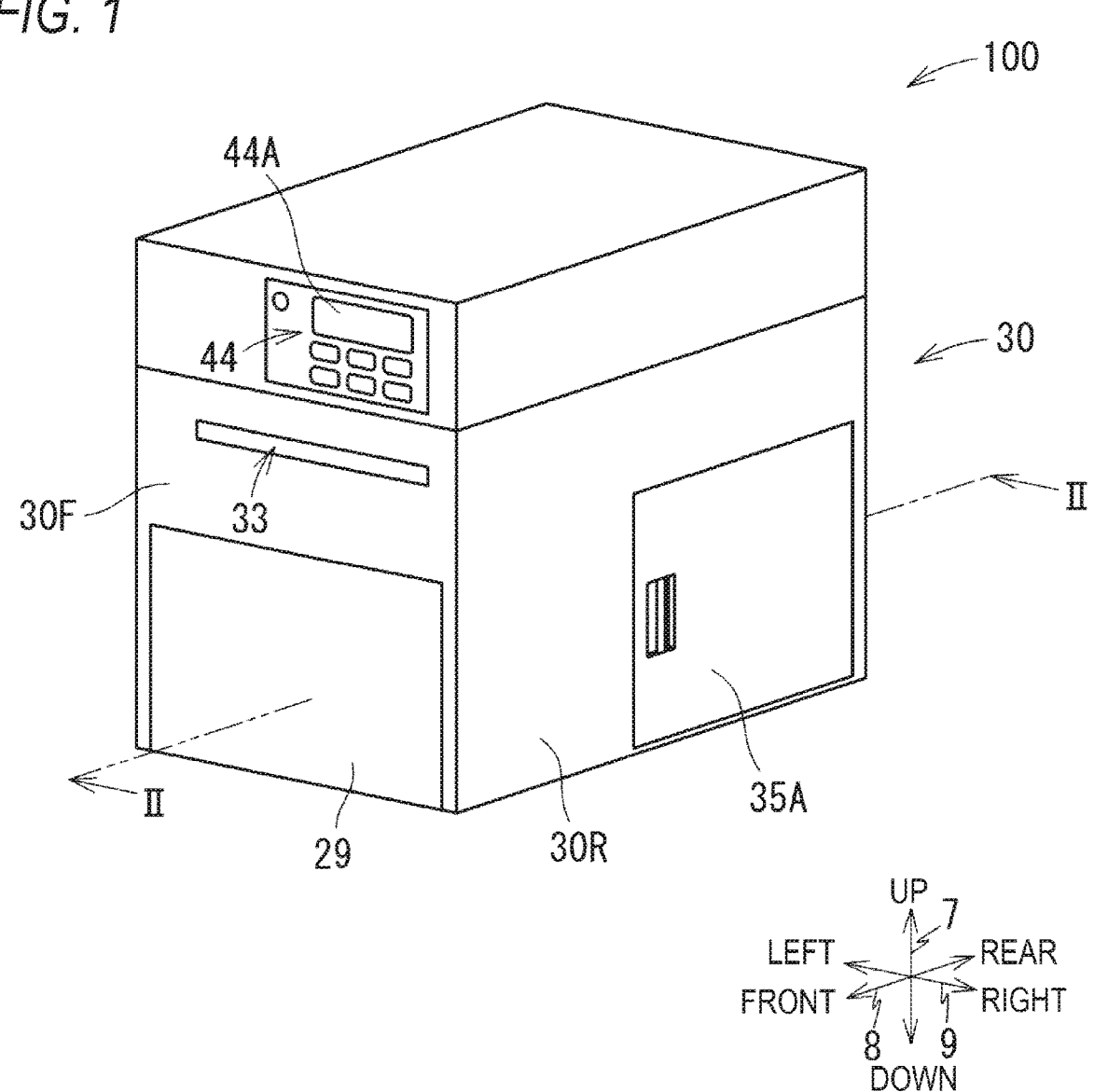
FIG. 1 is an external perspective view of an image recording device 100 according to an embodiment of the present disclosure.

Hereinafter, a preferred embodiment of the present disclosure will be described. The present embodiment is merely one embodiment of the present disclosure, and it is needless to say that the embodiment can be modified without changing the gist of the present disclosure. In the following description, an advancement movement from a start point to an end point of an arrow is expressed as an "orientation", and a unidirectional or bidirectional movement along a line connecting the start point and the end point of the arrow is expressed as a "direction". In the following description, an up-down direction 7 is defined with reference to a state where an image recording device 100 is usable (a state in FIG. 1), a front-rear direction 8 is defined with a side where a discharge port 33 is provided as a front side (a front surface), and a left-right direction 9 is defined when the image recording device 100 is viewed from the front side (the front surface).

Appearance Configuration of Image Recording Device 100

The image recording device 100 (an example of an ink ejection device) shown in FIG. 1 records an image on a sheet S forming a roll body 37 (see FIG. 2) using an ink jet recording method.

As shown in FIG. 1, the image recording device 100 includes a housing 30. The housing 30 has a substantially rectangular parallelepiped shape as a whole. A frame for supporting each member may be appropriately provided inside the housing 30.

The slit-shaped discharge port 33 that is long in the left-right direction 9 is formed in a front surface 30F of the housing 30. The image-recorded sheet S (see FIG. 2) is discharged from the discharge port 33. An operation panel 44 is provided on the front surface 30F. A user performs an input on the operation panel 44 to operate the image recording device 100 or confirm various settings.

A right cover 35A is located on a right surface 30R of the housing 30. By opening and closing the right cover 35A, a holder 35 and the like (see FIG. 2) located in a sheet storage space 32C are exposed or shielded.

A front cover 29 is located on the front surface 30F of the housing 30. The front cover 29 can be opened around a pivot shaft (not shown) extending in the left-right direction 9 in the vicinity of a lower end of the front cover 29 such that an upper end side of the front cover 29 falls forward. By opening and closing the front cover 29, a cartridge mounting portion 110 and the like (see FIG. 2) located in an internal space 31 of the housing 30 are exposed or shielded.

Internal Configuration of Image Recording Device 100

Figure 2:
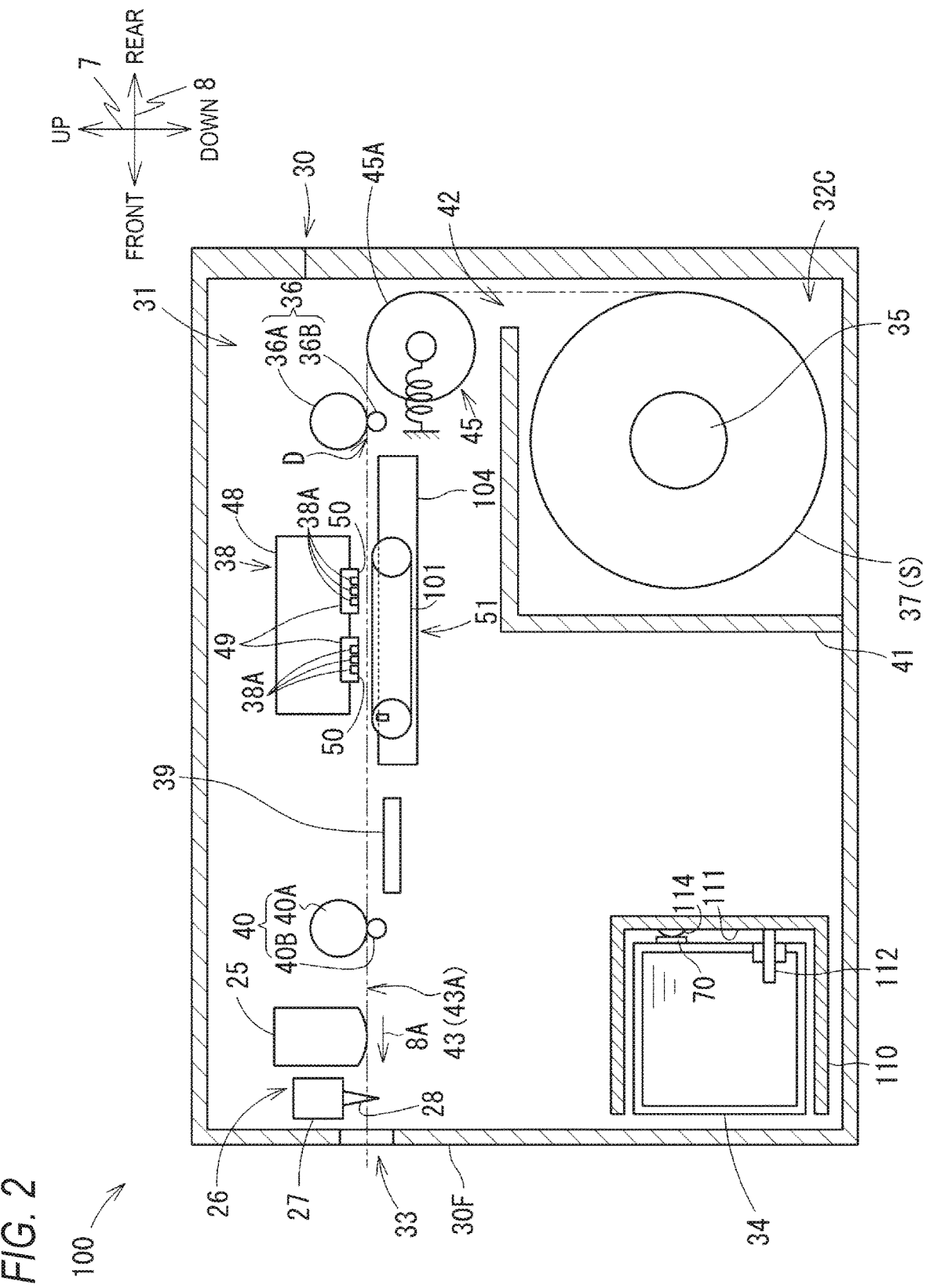
FIG. 2 is a cross-sectional view taken along a line II-II in FIG. 1.

As shown in FIG. 2, the holder 35, a tensioner 45, a conveyance roller pair 36, a conveyance roller pair 40, a head 38, a platen 51, a heater 39, a CIS 25, a cutter unit 26, the cartridge mounting portion 110, and the like are arranged in the internal space 31 of the housing 30. Although not shown in FIG. 2, a fixing unit, an image sensor, a maintenance mechanism, and the like may be located in the internal space 31.

A partition wall 41 is provided in the internal space 31. The partition wall 41 partitions a rear lower portion of the internal space 31 to define the sheet storage space 32C. The sheet storage space 32C is a space surrounded by the partition wall 41 and a lower housing 32 and isolated from the head 38 and the like.

The roll body 37 is stored in the sheet storage space 32C. The roll body 37 includes a core tube and the long sheet S.

The sheet S is wound around the core tube in a roll shape in a circumferential direction of a shaft core of the core tube. The sheet S is a non-absorbing medium having a surface with low water absorbability. Specifically, the sheet S refers to a sheet whose water absorption amount from the start of contact to 30 msec$^{1/2}$ is 10 mL/m$^2$ or less in a Bristow method. Here, msec$^{1/2}$ refers to the square root of msec. In addition, the term "non-absorbing" may refer to a water absorption rate of less than 0.5% in 24 hours measured in accordance with ASTM D570. More specifically, the term "non-absorbing" may refer to the water absorption rate of less than 0.2%. A unit "%" of the water absorption rate is based on mass. Examples of a material of the sheet S include plastics (such as polypropylene, polyethylene, polyethylene terephthalate, polyvinyl chloride resin, and polycarbonate).

The tensioner 45 is located above the partition wall 41 in a rear portion of the internal space 31. The tensioner 45 has an outer circumferential surface 45A facing an outside of the lower housing 32. The outer circumferential surface 45A has a size equal to or larger than a maximum width of the sheet in the left-right direction 9, and has a shape that is symmetrical with respect to a sheet passing center (a center of the sheet S in the left-right direction 9). An upper end of the outer circumferential surface 45A is located at substantially the same up-down position as a nip position of the conveyance roller pair 36 in the up-down direction 7.

The sheet S pulled out from the roll body 37 is hung and abutted on the outer circumferential surface 45A. The sheet S is curved forward along the outer circumferential surface 45A, extends in a conveyance orientation 8A, and is guided to the conveyance roller pair 36. The conveyance orientation 8A is a forward orientation along the front-rear direction 8. The tensioner 45 applies tension to the sheet S using a well-known method.

The conveyance roller pair 36 is located in the front of the tensioner 45. The conveyance roller pair 36 includes a conveyance roller 36A and a pinch roller 36B. The conveyance roller 36A and the pinch roller 36B abut against each other at substantially the same up-down position as the upper end of the outer circumferential surface 45A. The conveyance roller pair 36 is an example of a conveyance device.

The conveyance roller pair 40 is located in the front of the conveyance roller pair 36. The conveyance roller pair 40 includes a conveyance roller 40A and a pinch roller 40B. The conveyance roller 40A and the pinch roller 40B abut against each other at substantially the same up-down position as the upper end of the outer circumferential surface 45A.

The conveyance rollers 36A and 40A are rotated by a driving force transmitted from a motor (not shown). The conveyance roller pair 36 rotates while nipping the sheet S extending from the tensioner 45 in the conveyance orientation 8A, thereby feeding the sheet S in the conveyance orientation 8A along a conveyance surface 43A. The conveyance roller pair 40 rotates while nipping the sheet S fed from the conveyance roller pair 36, thereby feeding the sheet S in the conveyance orientation 8A. The sheet S is pulled out from the sheet storage space 32C toward the tensioner 45 through a gap 42 by the rotation of the conveyance roller pairs 36 and 40.

As shown in FIG. 2, a conveyance path 43 extending from the upper end of the outer circumferential surface 45A to the discharge port 33 is formed in the internal space 31. The conveyance path 43 extends substantially linearly along the conveyance orientation 8A, and is a space through which the sheet S can pass. In FIG. 2, the conveyance surface 43A is indicated by a two-dot chain line indicating the conveyance path 43. The conveyance path 43 is defined by a guide member (not shown), the head 38, the platen 51, and the like, which are located apart from each other in the up-down direction 7.

The head 38 is located above the conveyance path 43 and downstream of the conveyance roller pair 36 in the conveyance orientation 8A. The head 38 includes a frame 48 and ejection modules 49 each including a plurality of nozzles 38A. The ejection module 49 is supported by the frame 48. The ejection module 49 includes an inflow port 22 and an outflow port 23. The inflow port 22 and the outflow port 23 are connected to a manifold 24. The manifold 24 is connected to the plurality of nozzles 38A (see FIG. 3). The plurality of nozzles 38A eject an aqueous ink supplied from an ink sub-tank 181 (see FIG. 3) downward toward the sheet S supported by a conveyance belt 101. Accordingly, an image is recorded on the sheet S.

The platen 51 is located below the conveyance path 43 and downstream of the conveyance roller pair 36 in the conveyance orientation 8A. The platen 51 is located below the head 38 and faces the head 38. The platen 51 includes the conveyance belt 101 and a support portion 104. The conveyance belt 101 supports the sheet S, which is conveyed in the conveyance orientation 8A by the conveyance roller pair 36 and is located directly below the head 38. The conveyance belt 101 conveys the supported sheet S in the conveyance orientation 8A.

The heater 39 is located below the conveyance path 43, downstream of the head 38 in the conveyance orientation 8A, and upstream of the conveyance roller pair 40 in the conveyance orientation 8A. The heater 39 heats the sheet S conveyed through the conveyance path 43.

The CIS 25 is located above the conveyance path 43 and downstream of the conveyance roller pair 40 in the conveyance orientation 8A. The CIS 25 reads the image on a printing surface of the sheet.

The cutter unit 26 is located above the conveyance path 43 and downstream of the CIS 25 in the conveyance orientation 8A. The cutter unit 26 includes a cutter 28 mounted on a cutter carriage 27. As the cutter 28 moves, the sheet S located on the conveyance path 43 is cut along the left-right direction 9.

The cartridge mounting portion 110 is located in the vicinity of a front end and a lower end of the housing 30, and has a box shape that opens toward the front. An ink cartridge 34 is inserted rearward into the cartridge mounting portion 110. An ink needle 112 extending forward is located on a rearward end surface 111 of the cartridge mounting portion 110. The ink needle 112 communicates with the ink sub-tank 181 through a flow path 182 (see FIG. 3).

A contact point 114 is located on the end surface 111. The contact point 114 is electrically connected to an IC substrate 70 of the ink cartridge 34 in a state where the ink cartridge 34 is mounted on the cartridge mounting portion 110. The controller 130 can access a storage area of the IC substrate 70 through the contact point 114. The contact point 114 is electrically connected to an IC substrate 12 of a preservation liquid cartridge 11 in a state where the preservation liquid cartridge 11 is mounted on the cartridge mounting portion 110 (see FIG. 3). The controller 130 can access a storage area of the IC substrate 12 through the contact point 114.

The ink cartridge 34 stores the aqueous ink. When the aqueous ink is consumed, the ink cartridge 34 is removed from the cartridge mounting portion 110 and replaced with a new ink cartridge 34 storing an aqueous ink. The IC substrate 70 is located on a rear surface of the ink cartridge 34. The IC substrate 70 stores identification information indicating the ink cartridge 34 in the storage area.

Instead of the ink cartridge 34, the preservation liquid cartridge 11 (a second cartridge) is inserted into the cartridge mounting portion 110. The preservation liquid cartridge 11 stores a preservation liquid. When the image recording device 100 is stored for a long time without being used, instead of the ink cartridge 34, the preservation liquid cartridge 11 is mounted on the cartridge mounting portion 110. The IC substrate 12 is located on a rear surface of the preservation liquid cartridge 11. The IC substrate 12 stores identification information indicating the preservation liquid cartridge 11 in the storage area.

Ink Circuit 113

Figure 3:
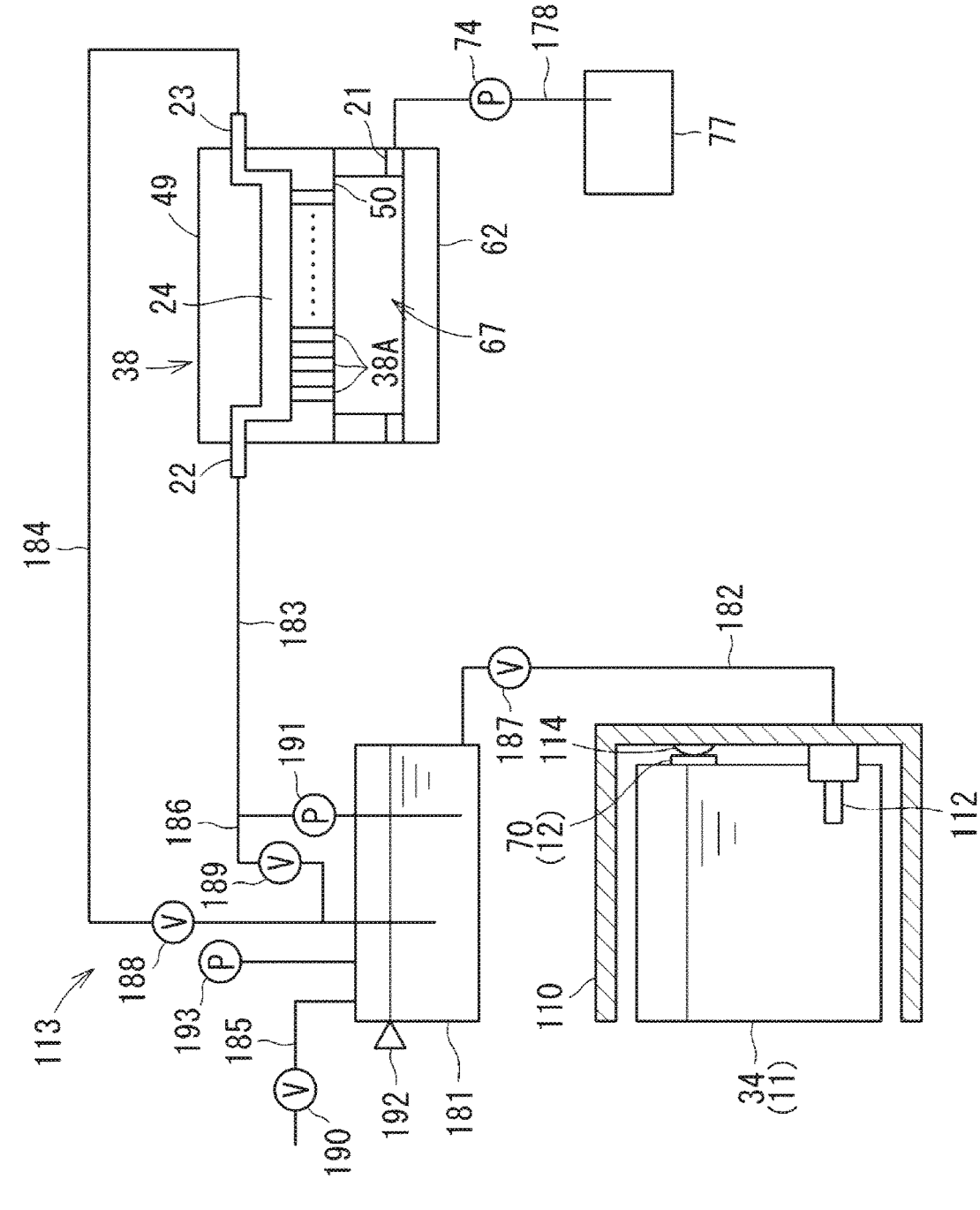
FIG. 3 is a schematic diagram showing an ink circuit 113.

As shown in FIG. 3, the cartridge mounting portion 110 and the ejection module 49 of the head 38 are connected by an ink circuit 113. The ink circuit 113 includes the ink sub-tank 181, flow paths 182, 183, and 184, an atmospheric flow path 185, a replenishment valve 187, an atmospheric release valve 190, a positive pressure pump 191, and a liquid level sensor 192.

The ink sub-tank 181 is located above the cartridge mounting portion 110 in the internal space 31 of the housing 30. The ink sub-tank 181 stores the aqueous ink in an internal space thereof. The internal space of the ink sub-tank 181 communicates with the ink needle 112 of the cartridge mounting portion 110 through the flow path 182. In a state where the ink cartridge 34 is mounted on the cartridge mounting portion 110, the ink stored in the ink cartridge 34 can flow into the ink sub-tank 181 through the flow path 182. In a state where the preservation liquid cartridge 11 is mounted on the cartridge mounting portion 110, the preservation liquid stored in the preservation liquid cartridge 11 can flow into the ink sub-tank 181 through the flow path 182. The replenishment valve 187 is located in the flow path 182. The replenishment valve 187 is controlled by the controller 130 to open and close the flow path 182.

The internal space of the ink sub-tank 181 and the ejection module 49 communicate with each other through the flow paths 183 and 184. The flow path 183 is connected to the inflow port 22 of the ejection module 49. The flow path 184 is connected to the outflow port 23 of the ejection module 49. The aqueous ink or the preservation liquid stored in the internal space of the ink sub-tank 181 can be supplied to the ejection module 49 through the flow path 183. The positive pressure pump 191 is located in the flow path 183. The positive pressure pump 191 is operated by the controller 130 controlling driving of a pump motor 138 (see FIG. 4). A purge shutoff valve 188 is located in the flow path 184. The purge shutoff valve 188 is controlled by the controller 130 to open and close the flow path 184.

A bypass flow path 186 is connected between the positive pressure pump 191 in the flow path 183 and the inflow port 22 and between the purge shutoff valve 188 in the flow path 184 and the ink sub-tank 181. A bypass valve 189 is located in the bypass flow path 186. The bypass valve 189 is controlled by the controller 130 to open and close the bypass flow path 186.

The internal space of the ink sub-tank 181 and the outside communicate with each other through the atmospheric flow path 185. The atmospheric release valve 190 is located in the atmospheric flow path 185. The atmospheric release valve 190 is controlled by the controller 130 to open and close the atmospheric flow path 185.

The liquid level sensor 192 is located at the ink sub-tank 181. The liquid level sensor 192 detects the presence or absence of the aqueous ink at a replenishment liquid level height of the internal space of the ink sub-tank 181. The liquid level sensor 192 outputs a detection signal to the controller 130. The liquid level sensor 192 outputs an ON signal as a detection signal when the aqueous ink is detected, and outputs an OFF signal as a detection signal when the aqueous ink is not detected. The controller 130 determines whether a liquid level in the internal space of the ink sub-tank 181 reaches the replenishment liquid level height, based on the detection signal output from the liquid level sensor 192.

A pressure reducing pump 193 is connected to the ink sub-tank 181. The pressure reducing pump 193 reduces a pressure in the internal space of the ink sub-tank 181 by discharging a gas in the internal space of the ink sub-tank 181 to the outside.

As shown in FIG. 3, a cap 62 is located below each ejection module 49. In FIG. 3, only one ejection module 49 is shown. The cap 62 is made of an elastic body such as rubber or silicon. The cap 62 has a box shape with an open top. The cap 62 includes a discharge port 21 through which the aqueous ink or the like flows out from an internal space 67 of the cap 62. The discharge port 21 is connected to a waste liquid tank 77 through a flow path 178. A suction pump 74 is provided in the flow path 178. The suction pump 74 is driven by a suction pump motor 58 (see FIG. 4).

Controller 130

Figure 4:
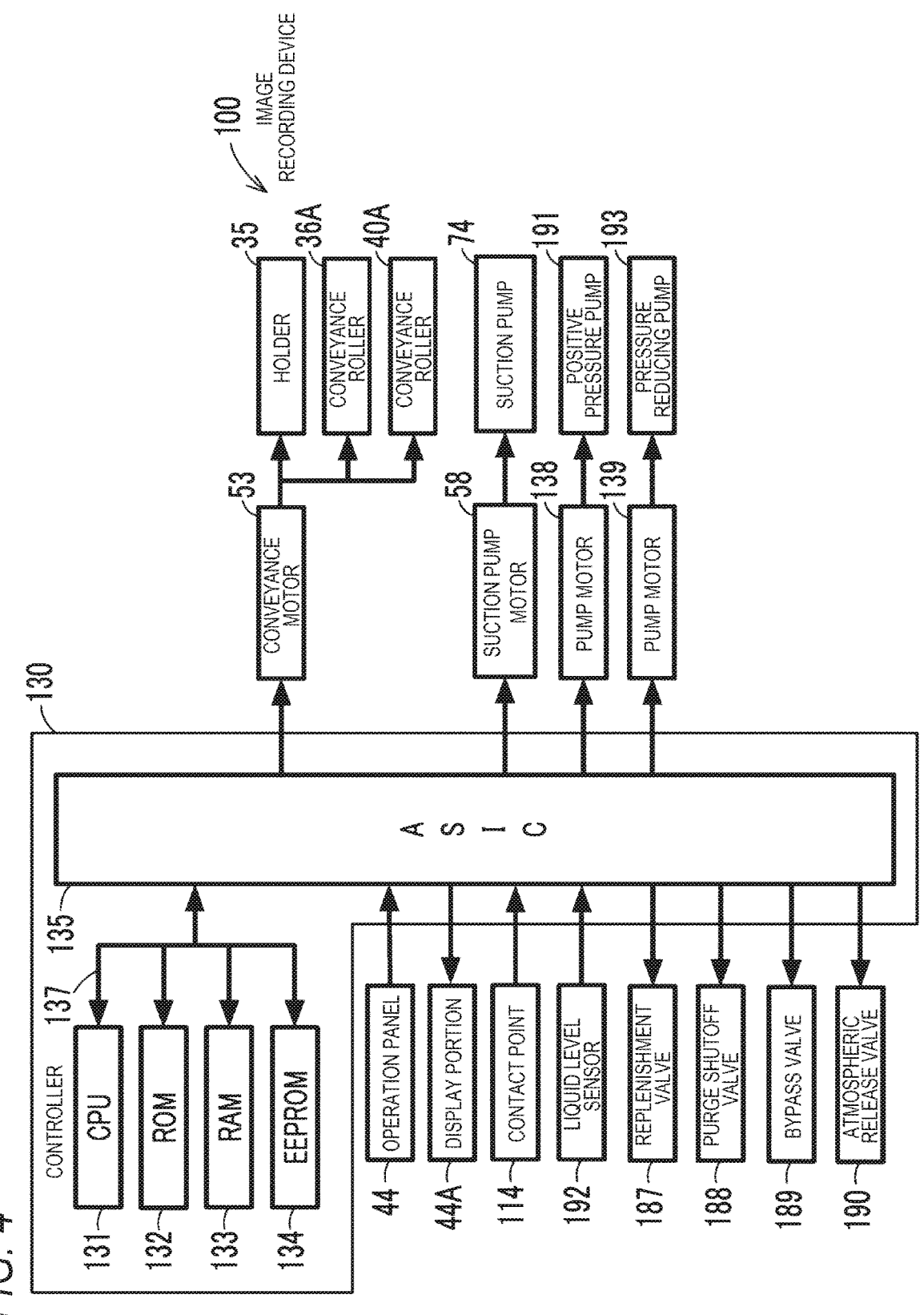
FIG. 4 is a block diagram showing a controller 130.

As shown in FIG. 4, the controller 130 includes a CPU 131, a ROM 132, a RAM 133, an EEPROM 134, and an ASIC 135, which are connected by an internal bus 137. The ROM 132 stores a program and the like for controlling various operations of the CPU 131. The RAM 133 is used as a storage area for temporarily storing data, signals, and the like used when the CPU 131 executes the program, or a work area for data processing. The EEPROM 134 stores settings, flags, aqueous ink supply date and time, the number of times of supply and discharge corresponding to an elapsed time, and the like, which are to be retained even after a power source is turned off. The number of times of supply and discharge is set in advance such that the number of times of supply and discharge increases as the elapsed time increases in units of time, for example.

A conveyance motor 53, the suction pump motor 58, and pump motors 138 and 139 are connected to the ASIC 135. The replenishment valve 187, the purge shutoff valve 188, and the atmospheric release valve 190 are connected to the ASIC 135. Each valve is connected to the ASIC 135 via a drive circuit for driving the valve.

The ASIC 135 generates a drive signal for rotating each motor, and controls the motor based on the drive signal. The motor rotates forward or backward according to the drive signal from the ASIC 135. The controller 130 controls driving of the conveyance motor 53 to rotate the holder 35, the conveyance roller 36A, and the conveyance roller 40A. The controller 130 controls the driving of the suction pump motor 58 to drive the suction pump 74. The controller 130 controls the driving of the pump motor 138 to drive the positive pressure pump 191. The controller 130 controls driving of the pump motor 139 to drive the pressure reducing pump 193.

The operation panel 44, a display portion 44A, the contact point 114, the liquid level sensor 192, and a piezoelectric element (not shown) are connected to the ASIC 135. The operation panel 44 outputs an operation signal corresponding to an operation of the user to the controller 130. The operation panel 44 may include, for example, a push button or a touch sensor superimposed on a display. The controller 130 performs reading or writing from or to the storage area of the IC substrate 70 of the ink cartridge 34 or the IC substrate 12 of the preservation liquid cartridge 11 through the contact point 114. The controller 130 receives the detection signal from the liquid level sensor 192. The piezoelectric element operates by being supplied with power from the controller 130 via a drive circuit (not shown). The controller 130 controls the power supply to the piezoelectric element, and causes ink droplets to be selectively ejected from the plurality of nozzles 38A.

Aqueous Ink

Hereinafter, details of the aqueous ink will be described. The aqueous ink contains water, a solvent group A, a binder polymer, a thickener, a coloring material, and a surfactant. In the aqueous ink, the solvent group A, the binder polymer, the thickener, the coloring material, and the surfactant are dissolved or dispersed in water. The aqueous ink has a viscosity at 25° C. in a range of 10 mPa·s to 14 mPa·s. The above range includes 10 mPa·s and 14 mPa·s. A viscosity of less than 10 mPa·s is not included in the above range. A viscosity exceeding 14 mPa·s is not included in the above range. The viscosity of the aqueous ink can be measured by, for example, a cone-plate rotational viscometer. The aqueous ink preferably has an evaporation rate of 70% or more when 5 g of the aqueous ink is placed in an upwardly opened container having a diameter of 60 mm and heated at 100° C. for 4 hours indoors at a room temperature of 25° C. and a humidity of 65%. The heating was performed by placing the container on the heater 39 and heating the container by the heater 39 such that a temperature in the container reached 100° C. The water is preferably ion-exchanged water or pure water. A weight percent of the water with respect to a total amount of the ink is in a range of 30.0 wt % to 60.0 wt %. The weight percent of the water may be, for example, a balance of the other components. The above range includes 30.0 wt % and 60.0 wt %. A weight percent of less than 30.0 wt % is not included in the above range. A weight percent exceeding 60.0 wt % is not included in the above range.

The solvent group A is added to adjust a decapping property and a drying property of the aqueous ink. The decapping property refers to a property that the nozzle is less likely to be clogged due to the aqueous ink attached to the nozzle. The drying property refers to ease of drying of the aqueous ink. The solvent group A is a solvent having a vapor pressure of 0.07 Pa or more at 25° C. Examples of the solvent group A include tripropylene glycol (TPG) (vapor pressure: 0.7 Pa), propylene glycol (PG) (vapor pressure: 10.6 Pa), 1,5-pentanediol (vapor pressure: 0.52 Pa), 1,3-propylene glycol (4.5 Pa), 1,2-butanediol (vapor pressure: 10.0 Pa), 1,3-butanediol (vapor pressure: 8.0 Pa), 1,4-butanediol (vapor pressure: 1.0 Pa), and 3-methyl-1,5-pentanediol (MPD) (vapor pressure: 0.072 Pa). The solvent group A is a concept including one or more (for example, two) solvents among these solvents. In the present embodiment, the solvent group A contains tripropylene glycol and propylene glycol. The solvent group A is present in the aqueous ink in a weight percent of 31.0 wt % to 55.0 wt % with respect to the total amount of the aqueous ink. The above range includes 31.0 wt % and 55.0 wt %. A weight percent of less than 31.0 wt % is not included in the above range. A weight percent exceeding 55.0 wt % is not included in the above range.

The binder polymer forms a coated film on the sheet S when the aqueous ink is dried. Examples of the binder polymer include an acrylic acid resin, a maleic acid ester resin, a vinyl acetate resin, a carbonate resin, a polycarbonate resin, a styrene resin, an ethylene resin, a polyethylene resin, a propylene resin, a polypropylene resin, a urethane resin, a polyurethane resin, a polyester resin, and a copolymer resin thereof, and an acrylic resin is preferred. In the present embodiment, the binder polymer is an acrylic polymer containing an acrylic acid as a monomer.

The acrylic polymer is available, for example, from a low viscosity binder polymer dispersion liquid (Mowinyl 6969D, manufactured by Japan Coating Resin Co., Ltd.) or a high viscosity binder polymer dispersion liquid (Mowinyl 6775, Mowinyl 6960, Mowinyl 6899D, RA-071B1, RA-071B2, manufactured by Japan Coating Resin Co., Ltd.). The low viscosity binder polymer dispersion liquid has a viscosity at 25° C. of 10 mPa·s or more and less than 100 mPa·s when being added to a low viscosity binder polymer dispersion medium such that the acrylic polymer is 38.0 wt % in the low viscosity binder polymer dispersion liquid. Hereinafter, the acrylic polymer added to the low viscosity binder polymer dispersion medium may be referred to as a low viscosity acrylic polymer for convenience.

The high viscosity binder polymer dispersion liquid has a viscosity at 25° C. of 100 mPa·s or more and less than 5000 mPa·s when being added to a high viscosity binder polymer dispersion medium such that the acrylic polymer is 38.0 wt % in the high viscosity binder polymer dispersion liquid. The viscosity of the high viscosity binder polymer dispersion liquid is preferably in a range of 2000 mPa·s to 5000 mPa·s. The above range includes 2000 mPa·s and 5000 mPa·s. A viscosity of less than 2000 mPa·s is not included in the above range. A viscosity exceeding 5000 mPa·s is not included in the above range. Hereinafter, the acrylic polymer added to the high viscosity binder polymer dispersion medium may be referred to as a high viscosity acrylic polymer for convenience. The high viscosity acrylic polymer is the same as the low viscosity acrylic polymer. A weight percent of the high viscosity acrylic polymer with respect to the total amount of the aqueous ink is preferably 4.2 wt % or less.

The thickener is added to increase the viscosity of the aqueous ink. The thickener is a liquid having a viscosity at 25° C. of 44 mPa·s or more when being mixed with water at 80.0 wt %. The thickener contains the high viscosity binder polymer dispersion liquid and a solvent group B. The high viscosity binder polymer dispersion liquid contains the acrylic polymer, and thus also serves as the binder polymer. On the other hand, a low viscosity acrylic polymer dispersion liquid does not function as the thickener.

The solvent group B is a solvent having a vapor pressure of less than 0.07 Pa at 25° C. Examples of the solvent group B include glycerin (vapor pressure: 0.01 Pa) and diglycerin (vapor pressure: less than 0.01 Pa). The solvent group B is a concept including one or more (for example, one or two) solvents among these solvents. The thickener is present in the aqueous ink in a weight percent of 13.0 wt % or less with respect to the total amount of the aqueous ink. The solvent group B is present in the aqueous ink in a weight percent of 3.0 wt % or less with respect to the total amount of the aqueous ink.

The coloring material is, for example, a pigment that can be dispersed in water by a pigment dispersing resin (a resin dispersant). Examples of the coloring material include carbon black, an inorganic pigment, and an organic pigment. Examples of the carbon black include furnace black, lamp black, acetylene black, and channel black. Examples of the inorganic pigment include titanium oxide, an iron oxide inorganic pigment, and a carbon black inorganic pigment. Examples of the organic pigment include an azo pigment such as azo lake, an insoluble azo pigment, a condensed azo pigment, and a chelate azo pigment; a polycyclic pigment such as a phthalocyanine pigment, a perylene and perinone pigment, an anthraquinone pigment, a quinacridone pigment, a dioxazine pigment, a thioindigo pigment, an isoindolinone pigment, and a quinophthalone pigment; a dye lake pigment such as a basic dye lake pigment and an acid dye lake pigment; a nitro pigment; a nitroso pigment; and an aniline black daylight fluorescent pigment. The resin dispersant may be, for example, a general polymer dispersant (the pigment dispersing resin), or may be independently adjusted.

A weight percent of the coloring material in the total amount of the aqueous ink is not particularly limited, and can be appropriately determined depending on, for example, a desired optical density or chroma. The weight percent of the coloring material is, for example, preferably in a range of 0.1 wt % or more and 20.0 wt % or less, and more preferably in a range of 1.0 wt % or more and 15.0 wt % or less. The weight percent of the coloring material is a weight of only the pigment, and does not include a weight of the binder polymer. The coloring material may be used alone or in combination of two or more thereof.

The surfactant may further contain a cationic surfactant, an anionic surfactant, or a nonionic surfactant. As these surfactants, for example, commercially available products may be used. Examples of the commercially available products include "Olfine (registered trademark) E1010", "Olfine (registered trademark) E1006", "Olfine (registered trademark) E1004", "Silface SAG 503A", and "Silface SAG 002", which are manufactured by Nissin Chemical Industry Co., Ltd. A weight percent of the surfactant in the total amount of the aqueous ink is, for example, 5.0 wt % or less, 3.0 wt % or less, or 0.1 wt % to 2.0 wt %.

The aqueous ink may further contain an additive known in the related art, as necessary. Examples of the additive include a pH adjusting agent, a viscosity adjusting agent, a surface tension adjusting agent, a preservative, an antifungal agent, a leveling agent, an antifoaming agent, a light stabilizer, an antioxidant, a nozzle drying inhibitor, a polymer component such as an emulsion, and a dye. Examples of the viscosity adjusting agent include polyvinyl alcohol, cellulose, and a water-soluble resin.

The aqueous ink can be prepared, for example, by uniformly mixing the water, the solvent group A, the binder polymer, the thickener, the coloring material, and the surfactant with other additives as necessary by a method known in the related art, and removing an insoluble matter by a filter or the like.

Hereinafter, a printing method will be described in which the controller 130 executes a process (an image recording process) at the time of recording an image on the sheet S using the image recording device 100.

Image Recording Process

When the controller 130 receives an instruction to record an image on the sheet S from the operation panel 44 or an external device such as an information processing device connected to the image recording device 100 via a LAN or the like, the controller 130 executes the image recording process. Specifically, the controller 130 drives the conveyance motor 53 to drive the holder 35, the conveyance roller 36A, and the conveyance roller 40A. Accordingly, the sheet S is pulled out from the roll body 37 and conveyed in the conveyance orientation 8A. When the sheet S reaches a position directly below the head 38, the controller 130 causes the aqueous ink to be ejected from the nozzles 38A. Accordingly, an image is recorded on the sheet S. The aqueous ink attached to the sheet S is dried by being heated when passing through the heater 39. As a result, a coated film of the binder polymer is formed, and the aqueous ink is fixed to the sheet S. The sheet S passing through the heater 39 is further conveyed in the conveyance orientation 8A by the conveyance roller pair 40. After the recorded image is checked by the CIS 25, the sheet S conveyed in the conveyance orientation 8A by the conveyance roller pair 40 is cut to a predetermined size by the cutter unit 26 and discharged. After the sheet S is cut, the controller 130 returns a leading end of the sheet S to a position of the conveyance roller pair 36 by reversely rotating the conveyance motor 53. The controller 130 repeatedly executes the above process until the image to be recorded is recorded on the sheet S.

Purge Process

On the other hand, during the image recording process, the controller 130 periodically executes a purge process (for example, when an image is recorded on 100 sheets S). Specifically, first, as shown in FIG. 3, the controller 130 opens the purge shutoff valve 188 and the bypass valve 189 and closes the replenishment valve 187 and the atmospheric release valve 190 in a state where the cap 62 covers a nozzle surface 50. Next, the controller 130 drives the suction pump motor 58 to drive the suction pump 74. Accordingly, the aqueous ink in the nozzle 38A is suctioned, and the aqueous ink is discharged from the internal space 67 of the cap 62 to the waste liquid tank 77 through the discharge port 21 and the flow path 178.

Operations and Effects of Embodiment

In the aqueous ink, since the weight percent of the solvent group A with respect to the total amount of the aqueous ink is 31.0 wt % or more, the weight percent of the water which is more easily evaporated than the solvent group A is small. Therefore, the aqueous ink attached to the nozzle is prevented from drying quickly, and thus the aqueous ink is less likely to solidify. Accordingly, clogging of the nozzle due to the solidified ink is prevented. That is, the decapping property is ensured. Since the weight percent of the solvent group A with respect to the total amount of the aqueous ink is 55.0 wt % or less, the weight percent of the water which is more easily evaporated than the solvent group A is increased. Therefore, the ink is easily dried quickly, and thus the drying property is ensured. Since the viscosity of the aqueous ink is adjusted to 10 mPa·s or more by the thickener, the image formed by the aqueous ink is less likely to become unclear. Therefore, image sharpness is ensured. Since the viscosity of the aqueous ink is adjusted to 14 mPa·s or less by the thickener, difficulty in ejecting the aqueous ink from the nozzle 38A is reduced. Therefore, an ejection property of the aqueous ink is ensured.

The aqueous ink contains two different solvents, and when a solvent having a hydrophobic group is selected, solubility of a hydrophobic surfactant is high.

In the aqueous ink, the weight percent of the solvent group B with respect to the total amount of the aqueous ink is 3.0 wt % or less. Therefore, since the weight percent of the solvent group B which is less likely to be evaporated than the solvent group A is small, the drying property of the aqueous ink is high.

The aqueous ink contains the high viscosity binder polymer dispersion liquid having the viscosity at 25° C. of 100 mPa·s or more and less than 5000 mPa·s when being added to the high viscosity binder polymer dispersion medium such that the acrylic polymer is 38.0 wt % in the high viscosity binder polymer dispersion liquid. Therefore, the coated film formed by the binder polymer has a high rubbing resistance.

In the aqueous ink, the weight percent of the high viscosity acrylic polymer with respect to the total amount of the aqueous ink is 4.2 wt % or less, and thus when the aqueous ink is dried, coating film formation of the high viscosity acrylic polymer on the nozzle surface 50 or in the nozzle 38A is prevented. Therefore, an ejection failure of the aqueous ink is prevented.

In the aqueous ink, since the binder polymer is an acrylic polymer, the coated film formed by the binder polymer has high rubbing resistance and stability.

The aqueous ink has a high drying property because the evaporation rate is 70% or more when 5 g of the aqueous ink is placed in the upwardly opened container having the diameter of 60 mm and heated for 4 hours indoors at the room temperature of 25° C. and the humidity of 65%.

In the image recording device 100 and the printing method, since the aqueous ink attached to the sheet S is heated when passing through the heater 39, the aqueous ink attached to the sheet S is easily dried.

In the image recording device 100 and the printing method, since a heating temperature of the heater 39 is 60° C. or higher, the aqueous ink attached to the sheet S is easily dried.

In the image recording device 100 and the printing method, the viscosity at 25° C. of the aqueous ink is as high as 10 mPa·s or more. Therefore, even when a distance between the head 38 and the sheet S in the up-down direction 7 is increased and the aqueous ink is ejected downward from the nozzle 38A, the aqueous ink is less likely to spread on the sheet S, and thus the image formed by the aqueous ink is less likely to become unclear. Therefore, a size restriction on a printing target is easily reduced by increasing the distance between the head 38 and the sheet S in the up-down direction 7.

In the image recording device 100 and the printing method, during the image recording process, the purge process of driving the suction pump 74 is periodically executed in a state where the cap 62 covers the nozzle 38A, and thus the nozzle 38A is less likely to be clogged by a foreign matter.

In the image recording device 100 and the printing method, the sheet S is conveyed by the conveyance roller pair 36 to a position facing the head 38 in the up-down direction 7, and thus the image is suitably recorded on the sheet S.

Modifications

In the image recording device 100 and the printing method, the aqueous ink is ejected downward from the nozzle 38A, but the aqueous ink may be ejected in a horizontal direction from the nozzle 38A. In this case, the head 38 is disposed such that the nozzle surface 50 is oriented perpendicular to the horizontal direction. Even when the aqueous ink is ejected in the horizontal direction from the nozzle 38A, dripping of the aqueous ink attached to the sheet S is less likely to occur because the viscosity of the aqueous ink is as high as 10 mPa·s or more.

In the image recording device 100, the sheet S is the non-absorbing medium having the surface with low water absorbability, but may be an absorbing medium having a surface with high water absorbability. Examples of the absorbing medium include plain paper, glossy paper, and matte paper.

In the image recording device 100, the purge process is periodically executed during the image recording process, but the purge process may not be executed.

In the image recording device 100, the ink cartridge 34 and the preservation liquid cartridge 11 are separate and replaced with respect to the cartridge mounting portion 110, but the ink cartridge 34 and the preservation liquid cartridge 11 may be integrally formed and mounted on the cartridge mounting portion 110.

EXAMPLES

Hereinafter, Examples of the present disclosure will be described.

Example 1

An aqueous ink containing 37.6 wt % of pure water as water, 3.7 wt % of carbon black as a coloring material, 3.0 wt % of tripropylene glycol and 48.0 wt % of propylene glycol as a solvent group A, 5.0 wt % of a low viscosity acrylic polymer as a binder polymer, 1.4 wt % of Olfine (registered trademark) E1004 (manufactured by Nissin Chemical Industry Co., Ltd.) as a surfactant, and 1.2 wt % of a pigment dispersant was used. A viscosity of the aqueous ink is 13.2 mPa·s at 25° C. The low viscosity acrylic polymer was obtained from a low viscosity acrylic polymer dispersion liquid (Mowinyl 6969D, manufactured by Japan Coating Resin Co., Ltd.).

Example 2

Compositions were the same as those of Example 1 except that 39.1 wt % of pure water as the water, and 3.0 wt % of tripropylene glycol, 25.0 wt % of propylene glycol, and 21.5 wt % of 1,5-pentanediol as the solvent group A were used. A viscosity of an aqueous ink is 12.2 mPa·s at 25° C.

Example 3

Compositions were the same as those of Example 1 except that 33.6 wt % of pure water as the water and 55.0 wt % of propylene glycol as the solvent group A were used. A viscosity of an aqueous ink is 13.9 mPa·s at 25° C.

Example 4

Compositions were the same as those of Example 1 except that 38.6 wt % of pure water as the water and 50.0 wt % of propylene glycol as the solvent group A were used. A viscosity of an aqueous ink is 11.4 mPa·s at 25° C.

Example 5

Compositions were the same as those of Example 1 except that 33.6 wt % of pure water as the water, 55.0 wt % of propylene glycol as the solvent group A, and 3.0 wt % of glycerin as a solvent group B were used. A viscosity of an aqueous ink is 13.0 mPa·s at 25° C.

Example 6

Compositions were the same as those of Example 1 except that 35.6 wt % of pure water as the water, 50.0 wt % of propylene glycol as the solvent group A, and 3.0 wt % of glycerin as the solvent group B were used. A viscosity of an aqueous ink is 13.1 mPa·s at 25° C.

Example 7

Compositions were the same as those of Example 1 except that 51.7 wt % of pure water as the water, 4.2 wt % of a high viscosity acrylic polymer as the binder polymer, 31.0 wt % of propylene glycol as the solvent group A, and 11.0 wt % of a high viscosity binder polymer dispersion liquid (Mowinyl 6775, manufactured by Japan Coating Resin Co., Ltd.) as a thickener were used. A viscosity of an aqueous ink is 12.8 mPa·s at 25° C. A weight percent of the high viscosity binder polymer dispersion liquid is a sum of 4.2 wt % of a high viscosity acrylic polymer and 6.8 wt % of a high viscosity acrylic polymer dispersion medium. In Table 1, the weight percent of the high viscosity acrylic polymer dispersion medium was shown in order to make it easy to understand that the total is 100 wt %.

Example 8

Compositions were the same as those of Example 1 except that 49.7 wt % of pure water as the water, 3.8 wt % of a high viscosity acrylic polymer as the binder polymer, 31.0 wt % of propylene glycol as the solvent group A, 3.0 wt % of glycerin as the solvent group B, and 10.0 wt % of a high viscosity binder polymer dispersion liquid as the thickener were used. A viscosity of an aqueous ink is 13.3 mPa·s at 25° C. A weight percent of the high viscosity binder polymer dispersion liquid is a sum of 3.8 wt % of a high viscosity acrylic polymer and 6.2 wt % of a high viscosity acrylic polymer dispersion medium.

Example 9

Compositions were the same as those of Example 1 except that 45.4 wt % of pure water as the water, 48.0 wt % of tripropylene glycol as the solvent group A, 1.0 wt % of a low viscosity acrylic polymer as the binder polymer, and 3.0 wt % of carbon black as the coloring material were used. A viscosity of an aqueous ink is 12.5 mPa·s at 25° C.

Example 10

Compositions were the same as those of Example 1 except that 49.6 wt % of pure water as the water, 31.0 wt % of tripropylene glycol as the solvent group A, and 10.0 wt % of a low viscosity acrylic polymer as the binder polymer were used. A viscosity of an aqueous ink is 12.3 m·Pas at 25° C.

Example 11

Compositions were the same as those of Example 1 except that 38.4 wt % of pure water as the water, 55.0 wt % of 1,5-pentanediol as the solvent group A, 1.0 wt % of a low viscosity acrylic polymer as the binder polymer, and 3.0 wt % of carbon black as the coloring material were used. A viscosity of an aqueous ink is 13.9 mPa·s at 25° C.

Example 12

Compositions were the same as those of Example 1 except that 51.8 wt % of pure water as the water, 3.0 wt % of a high viscosity acrylic polymer as the binder polymer, 31.0 wt % of 1,5-pentanediol as the solvent group A, 3.0 wt % of glycerin as the solvent group B, and 7.9 wt % of a high viscosity binder polymer dispersion liquid as the thickener were used. A viscosity of an aqueous ink is 12.8 mPa·s at 25° C. A weight percent of the high viscosity binder polymer dispersion liquid is a sum of 3.0 wt % of a high viscosity acrylic polymer and 4.9 wt % of a high viscosity acrylic polymer dispersion medium.

Example 13

Compositions were the same as those of Example 1 except that 37.6 wt % of pure water as the water, 2.0 wt % of a low viscosity acrylic polymer as the binder polymer, and 3.0 wt % of glycerin as the solvent group B were used. A viscosity of an aqueous ink is 11.4 mPa·s at 25° C.

Example 14

Compositions were the same as those of Example 1 except that 37.6 wt % of pure water as the water, 2.0 wt % of low viscosity polyethylene (ARROWBASE SB-1030N manufactured by UNITIKA LTD.) as the binder polymer, and 3.0 wt % of glycerin as the solvent group B were used. A viscosity of an aqueous ink is 11.9 mPa·s at 25° C.

Example 15

Compositions were the same as those of Example 1 except that 33.6 wt % of pure water as the water and 55.0 wt % of 1,3-propylene glycol as the solvent group A were used. A viscosity of an aqueous ink is 13.1 mPa·s at 25° C.

Example 16

Compositions were the same as those of Example 1 except that 40.6 wt % of pure water as the water and 48.0 wt % of 1,2-butanediol as the solvent group A were used. A viscosity of an aqueous ink is 11.7 mPa·s at 25° C.

Example 17

Compositions were the same as those of Example 1 except that 41.6 wt % of pure water as the water and 47.0 wt % of 1,3-butanediol as the solvent group A were used. A viscosity of an aqueous ink is 13.6 mPa·s at 25° C.

Example 18

Compositions were the same as those of Example 1 except that 40.6 wt % of pure water as the water and 48.0 wt % of 1,4-butanediol as the solvent group A were used. A viscosity of an aqueous ink is 12.3 mPa·s at 25° C.

Example 19

Compositions were the same as those of Example 1 except that 43.6 wt % of pure water as the water and 45.0 wt % of 3-methyl-1,5-pentanediol as the solvent group A were used. A viscosity of an aqueous ink is 12.8 mPa·s at 25° C.

Example 20

Compositions were the same as those of Example 1 except that 45.2 wt % of pure water as the water, 8.4 wt % of a low viscosity acrylic polymer as the binder polymer, and 11.0 wt % of tripropylene glycol and 29.0 wt % of propylene glycol as the solvent group A were used. A viscosity of an aqueous ink is 11.1 m·Pas at 25° C.

Example 21

Compositions were the same as those of Example 1 except that 37.6 wt % of pure water as the water, 2.0 wt % of polyurethane as the binder polymer, and 3.0 wt % of glycerin as the solvent group B were used. A viscosity of an aqueous ink is 12.2 mPa·s at 25° C.

Example 22

Compositions were the same as those of Example 1 except that 51.4 wt % of pure water as the water, 4.3 wt % of a high viscosity acrylic polymer as the binder polymer, 31.0 wt % of propylene glycol as the solvent group A, and 11.3 wt % of a high viscosity binder polymer dispersion liquid as the thickener were used. A viscosity of an aqueous ink is 13.5 mPa·s at 25° C. A weight percent of the high viscosity binder polymer dispersion liquid is a sum of 4.3 wt % of a high viscosity acrylic polymer and 7.0 wt % of a high viscosity acrylic polymer dispersion medium.

Example 23

Compositions were the same as those of Example 1 except that 51.6 wt % of pure water as the water, 8.0 wt % of a low viscosity acrylic polymer as the binder polymer, 31.0 wt % of tripropylene glycol as the solvent group A, and 3.0 wt % of glycerin as the solvent group B were used. A viscosity of an aqueous ink is 10.4 mPa·s at 25° C.

Example 24

Compositions were the same as those of Example 1 except that 54.4 wt % of pure water as the water, 2.0 wt % of a high viscosity acrylic polymer as the binder polymer, 31.0 wt % of 1,5-pentanediol as the solvent group A, 3.0 wt % of glycerin as the solvent group B, and 5.3 wt % of a high viscosity binder polymer dispersion liquid as the thickener were used. A viscosity of an aqueous ink is 10.2 mPa·s at 25° C. A weight percent of the high viscosity binder polymer dispersion liquid is a sum of 2.0 wt % of a high viscosity acrylic polymer and 3.3 wt % of a high viscosity acrylic polymer dispersion medium.

Example 25

Compositions were the same as those of Example 1 except that 53.9 wt % of pure water as the water, 2.2 wt % of a high viscosity acrylic polymer as the binder polymer, 31.0 wt % of 1,5-pentanediol as the solvent group A, 3.0 wt % of glycerin as the solvent group B, and 5.8 wt % of a high viscosity binder polymer dispersion liquid as the thickener were used. A viscosity of an aqueous ink is 10.6 mPa·s at 25° C. A weight percent of the high viscosity binder polymer dispersion liquid is a sum of 2.2 wt % of a high viscosity acrylic polymer and 3.6 wt % of a high viscosity acrylic polymer dispersion medium.

Example 26

Compositions were the same as those of Example 1 except that 54.4 wt % of pure water as the water, 2.2 wt % of a high viscosity acrylic polymer as the binder polymer, 31.0 wt % of 1,5-pentanediol as the solvent group A, 1.5 wt % of glycerin and 1.0 wt % of diglycerin as the solvent group B, and 5.8 wt % of a high viscosity binder polymer dispersion liquid as the thickener were used. A viscosity of an aqueous ink is 10.8 mPa·s at 25° C. A weight percent of the high viscosity binder polymer dispersion liquid is a sum of 2.2 wt % of a high viscosity acrylic polymer and 3.6 wt % of a high viscosity acrylic polymer dispersion medium.

Comparative Example 1

Compositions were the same as those of Example 1 except that 39.1 wt % of pure water as the water, 3.0 wt % of tripropylene glycol and 25.0 wt % of propylene glycol as the solvent group A, and 21.5 wt % of glycerin as the solvent group B were used. A viscosity of an aqueous ink is 12.7 mPa·s at 25° C.

Comparative Example 2

Compositions were the same as those of Comparative Example 1 except that 51.9 wt % of pure water as the water, 2.5 wt % of a low viscosity acrylic polymer and 2.6 wt % of a high viscosity acrylic polymer as the binder polymer, 8.6 wt % of glycerin as the solvent group B, and 6.9 wt % of a high viscosity binder polymer dispersion liquid as the thickener were used. A viscosity of an aqueous ink is 12.0 m·Pas at 25° C. A weight percent of the high viscosity binder polymer dispersion liquid is a sum of 2.6 wt % of a high viscosity acrylic polymer and 4.3 wt % of a high viscosity acrylic polymer dispersion medium.

Comparative Example 3

Compositions were the same as those of Comparative Example 1 except that 21.5 wt % of diglycerin as the solvent group B was used. A viscosity of an aqueous ink is 15.4 m·Pas at 25° C.

Comparative Example 4

Compositions were the same as those of Comparative Example 1 except that 32.6 wt % of pure water as the water and 56.0 wt % of propylene glycol as the solvent group A were contained and the solvent group B was omitted. A viscosity of an aqueous ink is 14.6 m·Pas at 25° C.

Comparative Example 5

Compositions were the same as those of Comparative Example 1 except that 58.6 wt % of pure water as the water, 3.0 wt % of tripropylene glycol and 27.0 wt % of propylene glycol as the solvent group A were contained and the solvent group B was omitted. A viscosity of an aqueous ink is 5.8 mPa·s at 25° C.

Comparative Example 6

Compositions were the same as those of Comparative Example 1 except that 28.5 wt % of pure water as the water, 56.0 wt % of propylene glycol as the solvent group A, and 4.0 wt % of glycerin as the solvent group B were used. A viscosity of an aqueous ink is 17.8 mPa·s at 25° C.

Comparative Example 7

Compositions were the same as those of Comparative Example 1 except that 54.6 wt % of pure water as the water, 30.0 wt % of propylene glycol as the solvent group A, and 4.0 wt % of glycerin as the solvent group B were used. A viscosity of an aqueous ink is 6.0 mPa·s at 25° C.

Comparative Example 8

Compositions were the same as those of Comparative Example 1 except that 28.6 wt % of pure water as the water, 56.0 wt % of tripropylene glycol as the solvent group A, and 4.0 wt % of glycerin as the solvent group B were used. A viscosity of an aqueous ink is 34.3 mPa·s at 25° C.

Comparative Example 9

Compositions were the same as those of Comparative Example 1 except that 54.6 wt % of pure water as the water, 30.0 wt % of tripropylene glycol as the solvent group A, and 4.0 wt % of glycerin as the solvent group B were used. A viscosity of an aqueous ink is 8.2 m·Pas at 25° C.

Comparative Example 10

Compositions were the same as those of Comparative Example 1 except that 38.4 wt % of pure water as the water, 1.0 wt % of a low viscosity acrylic polymer as the binder polymer, and 55.0 wt % of tripropylene glycol as the solvent group A were contained and the solvent group B was omitted. A viscosity of an aqueous ink is 17.8 mPa·s at 25° C.

Comparative Example 11

Compositions were the same as those of Comparative Example 1 except that 48.4 wt % of pure water as the water, 1.0 wt % of a low viscosity acrylic polymer as the binder polymer, and 45.0 wt % of tripropylene glycol as the solvent group A were contained and the solvent group B was omitted. A viscosity of an aqueous ink is 10.6 mPa·s at 25° C.

Comparative Example 12

Compositions were the same as those of Comparative Example 1 except that 48.7 wt % of pure water as the water, 4.2 wt % of a high viscosity acrylic polymer as the binder polymer, 31.0 wt % of propylene glycol as the solvent group A, 11.0 wt % of a high viscosity binder polymer dispersion liquid as the thickener, and 3.0 wt % of glycerin as the solvent group B were used. A viscosity of an aqueous ink is 15.1 mPa·s at 25° C. A weight percent of the high viscosity binder polymer dispersion liquid is a sum of 4.2 wt % of a high viscosity acrylic polymer and 6.8 wt % of a high viscosity acrylic polymer dispersion medium.

Comparative Example 13

Compositions were the same as those of Comparative Example 1 except that 33.6 wt % of pure water as the water and 55.0 wt % of tripropylene glycol as the solvent group A were contained and the solvent group B was omitted. A viscosity of an aqueous ink is 26.6 mPa·s at 25° C.

Comparative Example 14

Compositions were the same as those of Comparative Example 1 except that 54.6 wt % of pure water as the water, 31.0 wt % of tripropylene glycol as the solvent group A, and 3.0 wt % of glycerin as the solvent group B were used. A viscosity of an aqueous ink is 8.4 mPa·s at 25° C.

Comparative Example 15

Compositions were the same as those of Comparative Example 1 except that 33.6 wt % of pure water as the water and 55.0 wt % of 1,5-pentanediol as the solvent group A were contained and the solvent group B was omitted. A viscosity of an aqueous ink is 20.9 mPa·s at 25° C.

Comparative Example 16

Compositions were the same as those of Comparative Example 1 except that 36.6 wt % of pure water as the water, 2.0 wt % of a low viscosity acrylic polymer as the binder polymer, and 55.0 wt % of 1,5-pentanediol as the solvent group A were contained and the solvent group B was omitted. A viscosity of an aqueous ink is 14.6 m·Pas at 25° C.

Comparative Example 17

Compositions were the same as those of Comparative Example 1 except that 40.5 wt % of pure water as the water and 48.0 wt % of 1,3-propylene glycol as the solvent group A were contained and the solvent group B was omitted. A viscosity of an aqueous ink is 9.6 mPa·s at 25° C.

Comparative Example 18

Compositions were the same as those of Comparative Example 1 except that 40.6 wt % of pure water as the water and 48.0 wt % of 1,3-butanediol as the solvent group A were contained and the solvent group B was omitted. A viscosity of an aqueous ink is 14.1 mPa·s at 25° C.

Comparative Example 19

Compositions were the same as those of Comparative Example 1 except that 40.6 wt % of pure water as the water and 48.0 wt % of 3-methyl-1,5-pentanediol as the solvent group A were contained and the solvent group B was omitted. A viscosity of an aqueous ink is 14.9 mPa·s at 25° C.

Comparative Example 20

Compositions were the same as those of Comparative Example 1 except that 57.6 wt % of pure water as the water and 31.0 wt % of propylene glycol as the solvent group A were contained and the solvent group B was omitted. A viscosity of an aqueous ink is 5.3 mPa·s at 25° C.

Comparative Example 21

Compositions were the same as those of Comparative Example 1 except that 54.6 wt % of pure water as the water, 31.0 wt % of propylene glycol as the solvent group A, and 3.0 wt % of glycerin as the solvent group B were used. A viscosity of an aqueous ink is 5.9 mPa·s at 25° C.

Decapping Property Test

After the head 38 was left for 30 minutes in a state where the nozzle surface 50 was not covered with the cap 62, it was visually determined whether printing on the sheet S could be performed by ejecting the aqueous ink from the nozzle 38A according to the following evaluation criteria. As the sheet S, a non-absorbing medium, for example, a resin film formed of polypropylene was used. A: No pin missing or twisting was observed at all. B: Some pin missing or twisting was observed. C: Many pin missing or twisting was observed.

Drying Property Test

The aqueous ink was ejected from the nozzle 38A at a resolution of 600×600 dpi and a liquid droplet amount of about 17 pL to cause the aqueous ink to attach to the sheet S, and then the aqueous ink was heated at about 60° C. for 10 minutes by an infrared wire heater, and thereafter was visually determined according to the following evaluation criteria. As the sheet S, a non-absorbing medium, for example, a resin film formed of polypropylene was used. A: There is no disturbance when a coated film was rubbed with a finger. B: There is no stickiness when the coated film was touched with a finger. C: There is a stickiness when the coated film was touched with a finger. D: There is a disturbance when the coated film was touched with a finger.

Image Sharpness Test

An image was recorded on the sheet S by ejecting the aqueous ink from the nozzle 38A, and an image quality was visually determined according to the following evaluation criteria. As the sheet S, a non-absorbing medium, for example, a resin film formed of polypropylene was used. A: The image was sharp. B: Part of the image was blurred. C: The image was blurred overall.

First Ejection Property Test

An image was recorded on 100 sheets S by ejecting the aqueous ink from the nozzle 38A, and an image quality was visually determined according to the following evaluation criteria. As the sheet S, a non-absorbing medium, for example, a resin film formed of polypropylene was used. A: No pin missing or twisting was observed at all. B: Some pin missing or twisting was observed. C: Many pin missing or twisting was observed.

Rubbing Resistance Test

After the aqueous ink was ejected from the nozzle 38A to cause the aqueous ink to attach to the sheet S, the aqueous ink was heated at a temperature of 60° C. for 10 minutes by the heater 39 to form a coated film of the binder polymer on the sheet S. The coated film was rubbed with a cotton swab and visually determined according to the following evaluation criteria. A: No peeling of the coated film occurred at all. B: Slight peeling of the coated film occurred. C: Peeling of the coated film occurred.

Second Ejection Property Test

After the aqueous ink was ejected from the nozzle 38A, the head 38 was left for 30 minutes in a state where the nozzle surface 50 was not covered with the cap 62, and thereafter an image was recorded on the sheet S by ejecting the aqueous ink from the nozzle 38A, and an image quality was visually determined according to the following evaluation criteria. A: No pin missing or twisting was observed at all. B: Some pin missing or twisting was observed. C: Many pin missing or twisting was observed.

Decapping Property Test Results

As shown in Tables 1 to 8, Examples 1 to 25 are evaluated as A or B, whereas Comparative Examples 1 to 3, 5, 7, and 9 are evaluated as C, and it is understood that Examples 1 to 25 have an excellent decapping property. In Examples 1 to 25, this is considered to be because the solvent group A contained in the aqueous ink was 31.0 wt % or more, and thus the weight percent of the water which is more easily evaporated than the solvent group A was reduced, and the aqueous ink attached to the nozzle 38A was not solidified much. On the other hand, in Comparative Examples 1 to 3, 5, 7, and 9, this is considered to be because the solvent group A contained in the aqueous ink was 30.0 wt % or less, and thus the weight percent of the water which is more easily evaporated than the solvent group A was increased, and most of the aqueous ink attached to the nozzle 38A was solidified by drying.

Drying Property Test Results

As shown in Tables 1 to 8, Examples 1 to 26 are evaluated as A or B, whereas Comparative Examples 4, 6, and 8 are evaluated as D, and it is understood that Examples 1 to 26 have an excellent drying property. In Examples 1 to 26, this is considered to be because the solvent group A contained in the aqueous ink was limited to 55.0 wt % or less, and thus the weight percent of the water which is more easily evaporated than the solvent group A was large. On the other hand, in Comparative Examples 4, 6, and 8, this is considered to be because the solvent group A contained in the aqueous ink was 56.0 wt %, and thus the weight percent of the water which is more easily evaporated than the solvent group A was small.

When Example 5 was compared with Comparative Example 6, the solvent group B contained in the aqueous ink was 3.0 wt % in Example 5, whereas the solvent group B was 4.0 wt % in Comparative Example 6. It is considered that the weight percent of the solvent group B which is less likely to be evaporated than the solvent group A is smaller in Example 5, and thus the evaluation of the drying property was higher in Example 5.

Image Sharpness Test Results

As shown in Tables 1 to 8, Examples 1 to 26 are evaluated as A or B, whereas Comparative Examples 5, 7, 9, 14, 17, 20, and 21 are evaluated as C, and it is understood that Examples 1 to 26 have excellent image sharpness. In Examples 1 to 25, it is considered that the viscosity at 25° C. of the aqueous ink was as high as 10.2 mPa·s or more, and thus a sharp image was obtained. In Comparative Examples 5, 7, 9, 14, 17, 20, and 21, it is considered that the viscosity at 25° C. of the aqueous ink was as low as 9.6 mPa·s or less, and thus the image was blurred overall.

First Ejection Property Test Results

As shown in Tables 1 to 8, Examples 1 to 25 are evaluated as A and B, whereas Comparative Examples 3, 4, 6, 8, 10, 12, 13, 15, 16, 18, and 19 are evaluated as C, and it is understood that Examples 1 to 26 have an excellent first ejection property. In Examples 1 to 26, this is considered to be because the viscosity of the aqueous ink was as low as 13.9 mPa·s or less, and thus the aqueous ink was smoothly ejected from the nozzle 38A. On the other hand, in Comparative Examples 3, 4, 6, 8, 10, 12, 13, 15, 16, 18, and 19, this is considered to be because the viscosity of the aqueous ink was as high as 14.1 mPa·s or more, and thus the aqueous ink was not smoothly ejected from the nozzle 38A, and a predetermined amount of aqueous ink did not attach to the sheet S.

Rubbing Resistance Test Results

As shown in Tables 1 to 8, Examples 7, 8, 12, 22, 24, and 25 are evaluated as A, whereas Examples other than these Examples are evaluated as B, and it is understood that coated films of Examples 7, 8, 12, 22, 24, and 25 have an excellent rubbing resistance. This is considered to be because the high viscosity acrylic polymer was used as the binder polymer in Examples 7, 8, 12, 22, 24, 25, and 26, whereas the low viscosity acrylic polymer was used as the binder polymer in Examples other than Examples 2 and 17.

Second Ejection Property Test Results

When Examples 7, 8, 12, 24, and 25 are compared with Example 22, Examples 7, 8, 12, 24, and 25 are evaluated as A, whereas Example 22 is evaluated as B, and it is understood that Examples 7, 8, 12, 24, and 25 have an excellent second ejection property. This is considered to be because the high viscosity acrylic polymer was contained in the aqueous ink in an amount of 4.3 wt % in Example 22, whereas the high viscosity acrylic polymer was contained in the aqueous ink in an amount of 4.2 wt % or less in Examples 7, 8, 12, 24, and 25, and thus when the aqueous ink is dried, coating film formation of the high viscosity acrylic polymer on the nozzle surface 50 or in the nozzle 38A is prevented. In other words, it is considered that, in a case where a high viscosity acrylic polymer is used as the binder polymer, when a weight percent of the high viscosity acrylic polymer is 4.2 wt % or less, the second ejection property is ensured.

TABLE 1

| | | Example 1 | Example 2 | Example 3 | Example 4 | Example 5 | Example 6 | Example 7 | Example 8 |
|---|---|---|---|---|---|---|---|---|---|
| Solvent group A (wt %) | TPG (vapor pressure: 0.7 Pa) | 3.0 | 3.0 | — | — | — | — | — | — |
| | PG (vapor pressure: 10.6 Pa) | 48.0 | 25.0 | 55.0 | 50.0 | 55.0 | 50.0 | 31.0 | 31.0 |
| | 1,5-pentanediol (vapor pressure: 0.52 Pa) | — | 21.5 | — | — | — | — | — | — |
| | 1,3-propylene glycol (vapor pressure: 4.5 Pa) | — | — | — | — | — | — | — | — |
| | 1,2-butanediol (vapor pressure: 10.0 Pa) | — | — | — | — | — | — | — | — |
| | 1,3-butanediol (vapor pressure: 8.0 Pa) | — | — | — | — | — | — | — | — |
| | 1,4-butanediol (vapor pressure: 1.0 Pa) | — | — | — | — | — | — | — | — |
| | MPD (vapor pressure: 0.072 Pa) | — | — | — | — | — | — | — | — |
| Solvent group B (wt %) | Glycerin (vapor pressure: 0.01 Pa) | — | — | — | — | 3.0 | 3.0 | — | 3.0 |
| | Diglycerin (vapor pressure < 0.01 Pa) | — | — | — | — | — | — | — | — |
| Binder (wt %) | Low viscosity acrylic polymer | 5.0 | 5.0 | 5.0 | 3.0 | 2.0 | 3.0 | — | — |
| | High viscosity acrylic polymer | — | — | — | — | — | — | 4.2 | 3.8 |
| | Low viscosity polyethylene | — | — | — | — | — | — | — | — |
| | Polyurethane | — | — | — | — | — | — | — | — |
| Binder dispersion medium (wt %) | High viscosity binder polymer dispersion medium | | | | | | | 6.8 | 6.2 |
| Coloring material (wt %) | Carbon black | 3.7 | 3.7 | 3.7 | 3.7 | 3.7 | 3.3 | 3.7 | 3.7 |
| Surfactant (wt %) | Olfine E1004 | 1,4 | 1.4 | 1.4 | 1.4 | 1.4 | 1.4 | 1.4 | 1.4 |
| Additive (wt %) | Pigment dispersant | 1.2 | 1.2 | 1.2 | 1.2 | 1.2 | 1.2 | 1.2 | 1.2 |
| Water (wt %) | Pure water | 37.6 | 39.1 | 33.6 | 38.6 | 33.6 | 35.6 | 51.7 | 49.7 |
| Viscosity (mPa · s) | | 12.2 | 13.2 | 13.9 | 11.4 | 13.0 | 13.1 | 12.8 | 13.3 |

TABLE 2

| | | Example 9 | Example 10 | Example 11 | Example 12 | Example 13 | Example 14 | Example 15 | Example 16 |
|---|---|---|---|---|---|---|---|---|---|
| Solvent group A (wt %) | TPG (vapor pressure: 0.7 Pa) | 48.0 | 31.0 | — | — | 3.0 | 3.0 | — | — |
| | PG (vapor pressure: 10.6 Pa) | — | — | — | — | 48.0 | 48.0 | — | — |
| | 1,5-pentanediol (vapor pressure: 0.52 Pa) | — | — | 55.0 | 31.0 | — | — | — | — |
| | 1,3-propylene glycol (vapor pressure: 4.5 Pa) | — | — | — | — | — | — | 55.0 | — |
| | 1,2-butanediol (vapor pressure: 10.0 Pa) | — | — | — | — | — | — | — | 48.0 |
| | 1,3-butanediol (vapor pressure: 8.0 Pa) | — | — | — | — | — | — | — | — |
| | 1,4-butanediol (vapor pressure: 1.0 Pa) | — | — | — | — | — | — | — | — |
| | MPD (vapor pressure: 0.072 Pa) | — | — | — | — | — | — | — | — |
| Solvent group B (wt %) | Glycerin (vapor pressure: 0.01 Pa) | — | 3.0 | — | 3.0 | 3.0 | 3.0 | — | — |
| | Diglycerin (vapor pressure < 0.01 Pa) | — | — | — | — | — | — | — | — |
| Binder (wt %) | Low viscosity acrylic polymer | 1.0 | 10.0 | 1.0 | — | 2.0 | — | 5.0 | 5.0 |
| | High viscosity acrylic polymer | — | — | — | 3.0 | — | — | — | — |
| | Low viscosity polyethylene | — | — | — | — | — | 2.0 | — | — |
| | Polyurethane | — | — | — | — | — | — | — | — |
| Binder dispersion medium (wt %) | High viscosity binder polymer dispersion medium | | | | 4.9 | | | | |
| Coloring material (wt %) | Carbon black | 3.0 | 3.7 | 3.0 | 3.7 | 3.7 | 3.7 | 3.7 | 3.7 |
| Surfactant (wt %) | Olfine E1004 | 1.4 | 1.4 | 1.4 | 1.4 | 1.4 | 1.4 | 1.4 | 1.4 |
| Additive (wt %) | Pigment dispersant | 1.2 | 1.2 | 1.2 | 1.2 | 1.2 | 1.2 | 1.2 | 1.2 |
| Water (wt %) | Pure water | 45.4 | 49.6 | 38.4 | 51.8 | 37.6 | 37.6 | 33.6 | 40.6 |
| Viscosity (mPa · s) | | 12.5 | 12.3 | 13.9 | 12.8 | 11.4 | 11.9 | 13.1 | 11.7 |

TABLE 3

| | | Example 17 | Example 18 | Example 19 | Example 20 | Example 21 | Example 22 | Example 23 | Example 24 |
|---|---|---|---|---|---|---|---|---|---|
| Solvent group A (wt %) | TPG (vapor pressure: 0.7 Pa) | — | — | — | 11.0 | 3.0 | — | 31.0 | — |
| | PG (vapor pressure: 10.6 Pa) | — | — | — | 29.0 | 48.0 | 31.0 | — | — |
| | 1,5-pentanediol (vapor pressure: 0.52 Pa) | — | — | — | — | — | — | — | 31.0 |
| | 1,3-propylene glycol (vapor pressure: 4.5 Pa) | — | — | — | — | — | — | — | — |
| | 1,2-butanediol (vapor pressure: 10.0 Pa) | — | — | — | — | — | — | — | — |
| | 1,3-butanediol (vapor pressure: 8.0 Pa) | 47.0 | — | — | — | — | — | — | — |
| | 1,4-butanediol (vapor pressure: 1.0 Pa) | — | 48.0 | — | — | — | — | — | — |
| | MPD (vapor pressure: 0.072 Pa) | — | — | 45.0 | — | — | — | — | — |
| Solvent group B (wt %) | Glycerin (vapor pressure: 0.01 Pa) | — | — | — | — | 3.0 | — | 3.0 | 3.0 |
| | Diglycerin (vapor pressure < 0.01 Pa) | — | — | — | — | — | — | — | — |
| Binder (wt %) | Low viscosity acrylic polymer | 5.0 | 5.0 | 5.0 | 8.4 | — | — | 8.0 | — |
| | High viscosity acrylic polymer | — | — | — | — | — | 4.3 | — | 2.0 |
| | Low viscosity polyethylene | — | — | — | — | — | — | — | — |
| | Polyurethane | — | — | — | — | 2.0 | — | — | — |
| Binder dispersion medium (wt %) | High viscosity binder polymer dispersion medium | | | | | | 7.0 | | 3.3 |
| Coloring material (wt %) | Carbon black | 3.7 | 3.7 | 3.7 | 3.7 | 3.7 | 3.7 | 3.7 | 3.7 |
| Surfactant (wt %) | Olfine E1004 | 1.4 | 1.4 | 1.4 | 1.4 | 1.4 | 1.4 | 1.4 | 1.4 |
| Additive (wt %) | Pigment dispersant | 1.2 | 1.2 | 1.2 | 1.2 | 1.2 | 1.2 | 1.2 | 1.2 |
| Water (wt %) | Pure water | 41.6 | 40.6 | 43.6 | 45.2 | 37.6 | 51.4 | 51.6 | 54.4 |
| | Viscosity (mPa · s) | 13.6 | 12.3 | 12.8 | 11.1 | 12.2 | 13.5 | 10.4 | 10.2 |

TABLE 4

| | | Example 25 | Example 26 | Comparative Example 1 | Comparative Example 2 | Comparative Example 3 | Comparative Example 4 | Comparative Example 5 | Comparative Example 6 |
|---|---|---|---|---|---|---|---|---|---|
| Solvent group A (wt %) | TPG (vapor pressure: 0.7 Pa) | — | — | 3.0 | 3.0 | 3.0 | — | 3.0 | — |
| | PG (vapor pressure: 10.6 Pa) | — | 31.0 | 25.0 | 25.0 | 25.0 | 56.0 | 27.0 | 56.0 |
| | 1,5-pentanediol (vapor pressure: 0.52 Pa) | 31.0 | 31.0 | — | — | — | — | — | — |
| | 1,3-propylene glycol (vapor pressure: 4.5 Pa) | — | | — | — | — | — | — | — |
| | 1,2-butanediol (vapor pressure: 10.0 Pa) | — | | — | — | — | — | — | — |
| | 1,3-butanediol (vapor pressure: 8.0 Pa) | — | | — | — | — | — | — | — |
| | 1,4-butanediol (vapor pressure: 1.0 Pa) | — | | — | — | — | — | — | — |
| | MPD (vapor pressure: 0.072 Pa) | — | | — | — | — | — | — | — |
| Solvent group B (wt %) | Glycerin (vapor pressure: 0.01 Pa) | 3.0 | 1.5 | 21.5 | 8.6 | — | — | — | 4.0 |
| | Diglycerin (vapor pressure < 0.01 Pa) | — | 1.0 | — | — | 21.5 | — | — | — |
| Binder (wt %) | Low viscosity acrylic polymer | — | | 5.0 | 2.5 | 5.0 | 5.0 | 5.0 | 5.0 |
| | High viscosity acrylic polymer | 2.2 | 2.2 | — | 2.6 | — | — | — | — |
| | Low viscosity polyethylene | — | | — | — | — | — | — | — |
| | Polyurethane | — | | — | — | — | — | — | — |
| Binder dispersion medium (wt %) | High viscosity binder polymer dispersion medium | 3.6 | 3.6 | | 4.3 | | | | |
| Coloring material (wt %) | Carbon black | 3.7 | 3.7 | 3.7 | 3.7 | 3.7 | 3.7 | 3.7 | 3.7 |
| Surfactant (wt %) | Olfine E1004 | 1.4 | 1.4 | 1.4 | 1.4 | 1.4 | 1.4 | 1.4 | 1.4 |
| Additive (wt %) | Pigment dispersant | 1.2 | 1.2 | 1.2 | 1.2 | 1.2 | 1.2 | 1.2 | 1.2 |
| Water (wt %) | Pure water | 53.9 | 54.4 | 39.1 | 51.9 | 39.1 | 32.6 | 58.6 | 28.5 |
| | Viscosity (mPa · s) | 10.6 | 10.8 | 12.7 | 12.0 | 15.4 | 14.6 | 5.8 | 17.8 |

TABLE 5

| | | Comparative Example 7 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Solvent group A (wt %) | TPG (vapor pressure: 0.7 Pa) | — | 56.0 | 30.0 | 55.0 | 45.0 | — | 55.0 | 31.0 |
| | PG (vapor pressure: 10.6 Pa) | 30.0 | — | — | — | — | 31.0 | — | — |
| | 1,5-pentanediol (vapor pressure: 0.52 Pa) | — | — | — | — | — | — | — | — |
| | 1,3-propylene glycol (vapor pressure: 4.5 Pa) | — | — | — | — | — | — | — | — |
| | 1,2-butanediol (vapor pressure: 10.0 Pa) | — | — | — | — | — | — | — | — |
| | 1,3-butanediol (vapor pressure: 8.0 Pa) | — | — | — | — | — | — | — | — |
| | 1,4-butanediol (vapor pressure: 1.0 Pa) | — | — | — | — | — | — | — | — |
| | MPD (vapor pressure: (0.072 Pa) | — | — | — | — | — | — | — | — |
| Solvent group B (wt %) | Glycerin (vapor pressure: 0.01 Pa) | 4.0 | 4.0 | 4.0 | — | — | 3.0 | — | 3.0 |
| | Diglycerin (vapor pressure < 0.01 Pa) | — | — | — | — | — | — | — | — |
| Binder (wt %) | Low viscosity acrylic polymer | 5.0 | 5.0 | 5.0 | 1.0 | 1.0 | — | 5.0 | 5.0 |
| | High viscosity acrylic polymer | — | — | — | — | — | 4.2 | — | — |
| | Low viscosity polyethylene | — | — | — | — | — | — | — | — |
| | Polyurethane | — | — | — | — | — | — | — | — |
| Binder dispersion medium (wt %) | High viscosity binder polymer dispersion medium | | | | | | 6.8 | | |
| Coloring material (wt %) | Carbon black | 3.7 | 3.7 | 3.7 | 3.0 | 3.0 | 3.7 | 3.7 | 3.7 |
| Surfactant (wt %) | Offine E1004 | 1.4 | 1.4 | 1.4 | 1.4 | 1.4 | 1.4 | 1.4 | 14 |
| Additive (wt %) | Pigment dispersant | 1.2 | 1.2 | 1.2 | 1.2 | 1.2 | 1.2 | 1.2 | 1.2 |
| Water (wt %) | Pure water | 54.6 | 28.6 | 54.6 | 38.4 | 48.4 | 48.7 | 33.6 | 54.6 |
| | Viscosity (mPa · s) | 6.0 | 34.3 | 8.2 | 17.8 | 10.6 | 15.1 | 26.6 | 8.4 |

TABLE 6

| | | Comparative Example 15 | Comparative Example 16 | Comparative Example 17 | Comparative Example 18 | Comparative Example 19 | Comparative Example 20 | Comparative Example 21 |
|---|---|---|---|---|---|---|---|---|
| Solvent group A (wt %) | TPG (vapor pressure: 0.7 Pa) | — | — | — | — | — | 31.0 | 31.0 |
| | PG (vapor pressure: 10.6 Pa) | — | — | — | — | — | — | — |
| | 1,5-pentanediol (vapor pressure: 0.52 Pa) | 55.0 | 55.0 | — | — | — | — | — |
| | 1,3-propylene glycol (vapor pressure: 4.5 Pa) | — | — | 48.0 | — | — | — | — |
| | 1,2-butanediol (vapor pressure: 10.0 Pa) | — | — | — | — | — | — | — |
| | 1,3-butanediol (vapor pressure: 8.0 Pa) | — | — | — | 48.0 | — | — | — |
| | 1,4-butanediol (vapor pressure: 1.0 Pa) | — | — | — | — | — | — | — |
| | MPD (vapor pressure: 0.072 Pa) | — | — | — | — | 48.0 | — | — |
| Solvent group B (wt %) | Glycerin (vapor pressure: 0.01 Pa) | — | — | — | — | — | — | 3.0 |
| | Diglycerin (vapor pressure < 0.01 Pa) | — | — | — | — | — | — | — |
| Binder (wt %) | Low viscosity acrylic polymer | 5.0 | 2.0 | 5.0 | 5.0 | 5.0 | 5.0 | 5.0 |
| | High viscosity acrylic polymer | — | — | — | — | — | — | — |
| | Low viscosity polyethylene | — | — | — | — | — | — | — |
| | Polyurethane | — | — | — | — | — | — | — |
| Binder dispersion medium (wt %) | High viscosity binder polymer dispersion medium | | | | | | | |

TABLE 6-continued

| | | Comparative Example 15 | Comparative Example 16 | Comparative Example 17 | Comparative Example 18 | Comparative Example 19 | Comparative Example 20 | Comparative Example 21 |
|---|---|---|---|---|---|---|---|---|
| Coloring material (wt %) | Carbon black | 3.7 | 3.7 | 3.7 | 3.7 | 3.7 | 3.7 | 3.7 |
| Surfactant (wt %) | Olfine E1004 | 1.4 | 1.4 | 1.4 | 1.4 | 1.4 | 1.4 | 1.4 |
| Additive (wt %) | Pigment dispersant | 1.2 | 1.2 | 1.2 | 1.2 | 1.2 | 1.2 | 1.2 |
| Water (wt %) | Pure water | 33.6 | 36.6 | 40.5 | 40.6 | 40.6 | 57.6 | 54.6 |
| | Viscosity (mPa · s) | 20.9 | 14.6 | 9.6 | 14.1 | 14.9 | 5.3 | 5.9 |

TABLE 7

| Evaluation item | Example 1 | Example 2 | Example 3 | Example 4 | Example 5 | Example 6 | Example 7 | Example 8 | Example 9 | Example 10 |
|---|---|---|---|---|---|---|---|---|---|---|
| Decapping property | A | A | A | A | A | A | B | B | A | B |
| Drying property | B | B | B | B | B | B | A | A | B | A |
| Image Sharpness | A | A | A | A | A | A | A | A | A | A |
| First ejection property | A | B | B | A | B | B | A | B | A | A |
| Rubbing resistance | B | B | B | B | B | B | A | A | B | B |
| Second ejection property | A | A | A | A | A | A | A | A | A | A |

| Evaluation item | Example 11 | Example 12 | Example 13 | Example 14 | Example 15 | Example 16 | Example 17 | Example 18 | Example 19 | Example 20 |
|---|---|---|---|---|---|---|---|---|---|---|
| Decapping property | A | B | A | A | A | A | A | A | A | A |
| Drying property | B | A | B | B | B | B | B | B | B | A |
| Image Sharpness | A | A | A | A | A | A | A | A | A | A |
| First ejection property | B | A | A | A | B | A | B | A | A | A |
| Rubbing resistance | B | A | B | B | B | B | B | B | B | B |
| Second ejection property | A | A | A | A | A | A | A | A | A | A |

| Evaluation item | Example 21 | Example 22 | Example 23 | Example 24 | Example 25 | Example 26 | Comparative Example 1 | Comparative Example 2 | Comparative Example 3 |
|---|---|---|---|---|---|---|---|---|---|
| Decapping property | A | B | B | B | B | B | C | C | C |
| Drying property | B | A | A | A | A | A | A | A | A |
| Image Sharpness | A | A | B | B | B | B | A | A | A |
| First ejection property | A | A | A | A | A | A | A | A | C |
| Rubbing resistance | B | A | B | A | A | A | B | A | B |
| Second ejection property | A | B | A | A | A | A | A | A | A |

TABLE 8

| Evaluation item | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|
| Decapping property | A | C | A | C | A | C | A | A | B |
| Drying property | D | A | D | A | D | A | C | C | B |
| Image Sharpness | A | C | A | C | A | C | A | B | A |
| First ejection property | C | B | C | B | C | B | C | A | C |
| Rubbing resistance | B | B | B | B | B | B | B | B | A |
| Second ejection property | A | A | A | A | A | A | A | A | A |

TABLE 8-continued

| Evaluation item | Comparative Example 13 | Comparative Example 14 | Comparative Example 15 | Comparative Example 16 | Comparative Example 17 | Comparative Example 18 | Comparative Example 19 | Comparative Example 20 | Comparative Example 21 |
|---|---|---|---|---|---|---|---|---|---|
| Decapping property | A | B | A | A | A | A | A | B | B |
| Drying property | C | B | C | C | C | C | C | B | B |
| Image Sharpness | A | C | A | A | C | A | A | C | C |
| First ejection property | C | B | C | C | B | C | C | B | B |
| Rubbing resistance | B | B | B | B | B | B | B | B | B |
| Second ejection property | A | A | A | A | A | A | A | A | A |

Additional Notes

The present disclosure discloses at least the following disclosure.

An aqueous ink according to one aspect of the present disclosure includes water, a solvent group A having a vapor pressure of 0.07 Pa or more at 25° C., a thickener, and a binder polymer. The solvent group A is present in the aqueous ink in a weight percent of 31.0 wt % to 55.0 wt % with respect to a total amount of the aqueous ink. The thickener is present in the aqueous ink in a weight percent of 13.0 wt % or less with respect to the total amount of the aqueous ink. The aqueous ink has a viscosity of 10 mPa·s to 14 mPa·s at 25° C.

Since the weight percent of the solvent group A with respect to the total amount of the aqueous ink is 31.0 wt % or more, a weight percent of the water which is more easily evaporated than the solvent group A is reduced. Therefore, the aqueous ink attached to a nozzle is prevented from drying quickly, and thus the aqueous ink is less likely to solidify. Accordingly, clogging of the nozzle due to the solidified ink is prevented. That is, a decapping property is ensured. Since the weight percent of the solvent group A with respect to the total amount of the aqueous ink is 55.0 wt % or less, the weight percent of the water which is more easily evaporated than the solvent group A is increased. Therefore, the ink is easily dried quickly, and thus a drying property is ensured. Since the viscosity of the aqueous ink at 25° C. is adjusted to 10 mPa·s or more by the thickener, an image formed by the aqueous ink is less likely to become unclear. Therefore, image sharpness is ensured. Since the viscosity of the aqueous ink at 25° C. is adjusted to 14 mPa·s or less by the thickener, difficulty in ejecting the ink from the nozzle is reduced. Therefore, an ink ejection property is ensured.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An aqueous ink, comprising:
water;
a solvent group A having a vapor pressure of 0.07 Pa or more at 25° C.;
a thickener; and
a binder polymer,
wherein:
the solvent group A is present in the aqueous ink in a weight percent of 31.0 wt % to 55.0 wt % with respect to a total amount of the aqueous ink,
the thickener is present in the aqueous ink in a weight percent of 13.0 wt % or less with respect to the total amount of the aqueous ink,
the thickener includes a high viscosity binder polymer dispersion liquid in which the binder polymer is dispersed,
the high viscosity binder polymer dispersion liquid has a viscosity of 100 mPa·s or more and less than 5000 mPa·s at 25° C. when being added to a high viscosity binder polymer dispersion medium such that the binder polymer is present in the high viscosity binder polymer dispersion liquid at 38.0 wt %,
the binder polymer is present in the aqueous ink in a weight percent of 4.2 wt % or less with respect to the total amount of the aqueous ink,
the binder polymer is an acrylic polymer,
the aqueous ink has a viscosity of 10 mPa·s to 14 mPa·s at 25° C., and
an evaporation rate is 70% or more when 5 g of the aqueous ink is placed in an upwardly opened container having a diameter of 60 mm and heated at 100° C. for 4 hours indoors at a room temperature of 25° C. and a humidity of 65%.

2. The aqueous ink according to claim 1, further comprising:
a surfactant, wherein
the solvent group A includes two different solvents.

3. The aqueous ink according to claim 1, wherein
the thickener includes a solvent group B having a vapor pressure of less than 0.07 Pa at 25° C., and
the solvent group B is present in the aqueous ink in a weight percent of 3.0 wt % or less with respect to the total amount of the aqueous ink.

4. An ink ejection device, comprising:
a head including a nozzle configured to eject the aqueous ink according to claim 1; and
a heater configured to heat at least one of a non-absorbing medium to which the aqueous ink ejected from the nozzle is attached and the aqueous ink attached to the non-absorbing medium.

5. The ink ejection device according to claim 4, wherein the heater is configured to heat at a heating temperature of 60° C. or higher.

6. The ink ejection device according to claim 5, wherein the nozzle is configured to eject the aqueous ink in a vertical direction.

7. The ink ejection device according to claim 5, wherein the nozzle is configured to eject the aqueous ink in a horizontal direction.

8. The ink ejection device according to claim 5, further comprising:

a cap configured to abut against the head and cover the nozzle;

a suction pump configured to suction an ink in the cap; and a controller, wherein the controller is configured to periodically execute a purge process of driving the suction pump in a state where the cap covers the nozzle during an image recording process of ejecting the aqueous ink from the nozzle.

9. A printing method, comprising:

ejecting the aqueous ink according to claim 1 from a nozzle; and heating, by a heater, at least one of a non-absorbing medium to which the aqueous ink ejected from the nozzle is attached and the aqueous ink attached to the non-absorbing medium.

10. The printing method according to claim 9, wherein in the heating, the heater is configured to heat at least one of the non-absorbing medium and the aqueous ink at 60° C. or higher.

11. The printing method according to claim 10, wherein in the ejecting, the nozzle is configured to eject the aqueous ink in a vertical direction.

12. The printing method according to claim 10, wherein in the ejecting, the nozzle is configured to eject the aqueous ink in a horizontal direction.

13. The printing method according to claim 9, further comprising:

periodically executing, by a controller, a purge process of driving a suction pump configured to suction an ink in a cap in a state where the cap covers the nozzle during an image recording process of recording an image on the non-absorbing medium by ejecting the aqueous ink from the nozzle.

14. The printing method according to claim 13, further comprising:

conveying, by a conveyer, the non-absorbing medium to a position facing a head before the first ejecting is performed.

* * * * *